(12) United States Patent
Guadalupe Castellanos et al.

(10) Patent No.: US 7,971,191 B2
(45) Date of Patent: Jun. 28, 2011

(54) SYSTEM AND METHOD FOR ANALYZING A PROCESS

(75) Inventors: Maria Guadalupe Castellanos, Sunnyvale, CA (US); Fabio Casati, Palo Alto, CA (US); Ming-Chien Shan, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2157 days.

(21) Appl. No.: 10/865,464

(22) Filed: Jun. 10, 2004

(65) Prior Publication Data

US 2005/0278705 A1 Dec. 15, 2005

(51) Int. Cl.
G06F 9/44 (2006.01)

(52) U.S. Cl. ........................ 717/128; 717/130

(58) Field of Classification Search .................. 717/158, 717/153, 155, 131, 154, 127–129, 150–151, 717/156, 160; 707/100; 712/231, 233; 395/707
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,412,806 A | 5/1995 | Du et al. | |
| 5,546,571 A | 8/1996 | Shan et al. | |
| 5,651,099 A | 7/1997 | Konsella | |
| 5,694,591 A * | 12/1997 | Du et al. .............................. 1/1 |
| 5,704,053 A * | 12/1997 | Santhanam .................. 717/158 |
| 5,729,666 A | 3/1998 | Konsella et al. | |
| 5,732,151 A | 3/1998 | Moon et al. | |
| 5,796,752 A * | 8/1998 | Sun et al. ...................... 714/738 |
| 5,826,239 A | 10/1998 | Du et al. | |
| 5,862,381 A * | 1/1999 | Advani et al. .................. 717/125 |
| 5,870,545 A | 2/1999 | Davis et al. | |
| 5,909,519 A | 6/1999 | Gunning et al. | |
| 5,937,388 A * | 8/1999 | Davis et al. ........................ 705/8 |
| 6,014,673 A | 1/2000 | Davis et al. | |
| 6,029,002 A * | 2/2000 | Afifi et al. ...................... 717/131 |
| 6,041,306 A * | 3/2000 | Du et al. ............................ 705/8 |
| 6,043,816 A | 3/2000 | Williams et al. | |
| 6,078,982 A | 6/2000 | Du et al. | |
| 6,195,377 B1 | 2/2001 | Bell et al. | |
| 6,230,313 B1 * | 5/2001 | Callahan et al. ............... 717/128 |
| 6,266,058 B1 | 7/2001 | Meyer | |
| 6,301,706 B1 * | 10/2001 | Maslennikov et al. ........ 717/160 |
| 6,308,163 B1 | 10/2001 | Du et al. | |
| 6,338,159 B1 * | 1/2002 | Alexander et al. ............ 717/128 |
| 6,343,274 B1 | 1/2002 | McCollom et al. | |
| 6,349,406 B1 * | 2/2002 | Levine et al. .................. 717/128 |
| 6,463,547 B1 | 10/2002 | Bailey et al. | |
| 6,463,548 B1 | 10/2002 | Bailey et al. | |

(Continued)

OTHER PUBLICATIONS

Jidong Long et al., Application of Loop Reduction to Learning Program Behaviors for Anomaly Dectection [online], [retrieved on Mar. 2, 2011], pp. 1-6. Retrieved from the Internet: <URL: http://www.cs.fsu.edu/~stoeckli/PublicationsVitae/LoopReduction.pdf>.*

(Continued)

*Primary Examiner* — Tuan Q Dam
*Assistant Examiner* — Hanh T Bui

(57) ABSTRACT

The present disclosure relates to a system and method for analyzing a process. Embodiments of the present invention may include obtaining a process execution trace including at least one subtrace, the process execution trace comprising at least one loop repetition. Further, embodiments may include removing loop repetitions within the process execution trace, identifying the subtrace as a point for data collection in a process, and collecting data related to the subtrace.

25 Claims, 3 Drawing Sheets

U.S. PATENT DOCUMENTS

| | | | | |
|---|---|---|---|---|
| 6,467,083 | B1 * | 10/2002 | Yamashita | 717/128 |
| 6,487,715 | B1 * | 11/2002 | Chamdani et al. | 717/154 |
| 6,574,001 | B2 | 6/2003 | Klosterman et al. | |
| 6,609,247 | B1 * | 8/2003 | Dua et al. | 717/128 |
| 6,629,108 | B2 | 9/2003 | Frey et al. | |
| 6,651,243 | B1 * | 11/2003 | Berry et al. | 717/130 |
| 6,675,379 | B1 * | 1/2004 | Kolodner et al. | 717/155 |
| 6,678,876 | B2 * | 1/2004 | Stevens et al. | 716/126 |
| 6,685,290 | B1 | 2/2004 | Farr et al. | |
| 6,688,786 | B2 | 2/2004 | Brown et al. | |
| 6,694,453 | B1 | 2/2004 | Shukla et al. | |
| 6,697,089 | B1 | 2/2004 | Bryan | |
| 6,748,583 | B2 * | 6/2004 | Aizenbud-Reshef et al. | 717/127 |
| 6,751,789 | B1 * | 6/2004 | Berry et al. | 717/130 |
| 6,817,010 | B2 * | 11/2004 | Aizenbud-Reshef et al. | 717/127 |
| 6,817,013 | B2 * | 11/2004 | Tabata et al. | 717/151 |
| 6,862,727 | B2 * | 3/2005 | Stevens | 717/128 |
| 6,971,092 | B1 * | 11/2005 | Chilimbi | 717/158 |
| 7,035,206 | B2 * | 4/2006 | Brewer et al. | 370/222 |
| 7,043,668 | B1 * | 5/2006 | Treue et al. | 714/45 |
| 7,069,544 | B1 * | 6/2006 | Thekkath | 717/128 |
| 7,076,776 | B2 * | 7/2006 | Kim et al. | 717/160 |
| 7,086,043 | B2 * | 8/2006 | Roediger et al. | 717/150 |
| 7,134,116 | B1 * | 11/2006 | Thekkath et al. | 717/128 |
| 7,140,008 | B2 * | 11/2006 | Chilimbi et al. | 717/158 |
| 7,155,708 | B2 * | 12/2006 | Hammes et al. | 717/155 |
| 7,165,190 | B1 * | 1/2007 | Srivastava et al. | 714/38 |
| 7,168,066 | B1 * | 1/2007 | Thekkath et al. | 717/128 |
| 7,174,543 | B2 * | 2/2007 | Schwemmlein et al. | 717/128 |
| 7,185,234 | B1 * | 2/2007 | Thekkath | 714/45 |
| 7,200,588 | B1 * | 4/2007 | Srivastava et al. | 1/1 |
| 7,207,035 | B2 * | 4/2007 | Kobrosly et al. | 717/128 |
| 7,228,528 | B2 * | 6/2007 | Wang et al. | 717/131 |
| 2002/0010623 | A1 | 1/2002 | McCollom et al. | |
| 2002/0087954 | A1 * | 7/2002 | Wang et al. | 717/131 |
| 2002/0095666 | A1 * | 7/2002 | Tabata et al. | 717/149 |
| 2002/0120918 | A1 * | 8/2002 | Aizenbud-Reshef et al. | 717/127 |
| 2002/0181001 | A1 | 12/2002 | Klosterman et al. | |
| 2003/0023955 | A1 * | 1/2003 | Bates et al. | 717/129 |
| 2003/0041315 | A1 * | 2/2003 | Bates et al. | 717/129 |
| 2003/0051231 | A1 * | 3/2003 | Schwemmlein et al. | 717/128 |
| 2003/0204513 | A1 * | 10/2003 | Bumbulis | 707/100 |
| 2004/0015934 | A1 * | 1/2004 | Muthukumar et al. | 717/160 |
| 2004/0088670 | A1 * | 5/2004 | Stevens et al. | 716/13 |
| 2004/0088689 | A1 * | 5/2004 | Hammes | 717/154 |
| 2005/0071832 | A1 * | 3/2005 | Kawahito | 717/151 |
| 2005/0183075 | A1 * | 8/2005 | Alexander et al. | 717/144 |
| 2005/0223364 | A1 * | 10/2005 | Peri et al. | 717/128 |
| 2005/0246700 | A1 * | 11/2005 | Archambault et al. | 717/156 |

OTHER PUBLICATIONS

Abdelwahab Hamou-Lhadj and Timothy C. Lethbridge, A Survey of Trace Exploration Tools and Techniques [online], 2004 [retrieved on Mar. 2, 2011], pp. 1-14. Retrieved from the Internet: <URL: http://users.encs.concordia.ca/~abdelw/secret/AkanshaAgarwal/HamouLhadj-CASCON04-HamouLethSurveyCameraReady.pdf>.*

* cited by examiner

SYSTEM AND METHOD FOR ANALYZING A PROCESS

BACKGROUND

A process may be described as a series of nodes or steps (e.g., actions, changes, or functions) that bring about a result. Processes may be used to define a wide range of activities such as the steps in a computer program, procedures for combining ingredients, manufacturing of an apparatus, and so forth. Further, metrics or process measurements may be defined to allow for process monitoring and data retrieval.

Specifically, metrics may be defined as properties of a process or business that are pertinent or that a user finds interesting. For example, business metrics may reflect business goals and include such things as cost, quality, outcome, and/or duration. Additionally, service level agreements (SLAs) inherently have underlying metrics. For example, a duration metric underlies a SLA requiring delivery of items no more than twenty-four hours after an order is placed. The "no more than twenty-four hours" requirement is merely a condition on a duration metric. Further, values for metrics may be computed using process execution data.

Process execution data may be defined as information or data related to a process instance. Executions or execution results in a process instance may be recorded using monitoring equipment, thus creating process execution data. Examples of process execution data include time stamps, orders, starting time, and ending time. A process definition may be composed of nodes (steps in the process), and arcs (connectors that define an order of execution among the nodes). During a process instance (i.e., an execution of a process definition), a certain node or string of nodes in the process may be executed zero, one, or many times. Accordingly, when a process instance is active (i.e., during execution), the availability of node execution data from that particular instance may be limited. This limited data may be referred to as partial process execution data. Further, the number of node executions (e.g., zero, one, or many) may depend on a process definition or formal description of a business process.

Existing tools, systems, and techniques may allow for the defining and computing of business metrics on top of business process execution data. For example, a tool may allow a user to define metrics, which may then be used to provide reports and/or monitoring of execution data associated with the metrics. Additionally, methods and systems may exist for deriving explanations and predictions regarding such metrics. These techniques may contemplate computing prediction models using process execution data acquired from active process instances (i.e., partial process execution data). For example, a tool may contemplate using a data mining technique to provide, at the very start of a process instance, a prediction for the value of one or more metrics. Further, the tool may provide an updated prediction as the execution proceeds based on the more current execution data. While existing techniques may be useful, a method to address the problem of computing a point or stage in a process execution where it makes sense to collect data and generate a prediction may provide a desirable additional benefit. The present disclosure may address the above issues and provide other advantages.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure concerns a system and method for prediction of generic, user-defined metrics at different points during a process. Embodiments of the present invention are related to computing process execution stages, which may be important or necessary to make effective predictions for active process instances. Specifically, given a process and past process execution data, embodiments of the present invention may identify a set of stages and their corresponding nodes, and consequently a set of information that can be mined to generate prediction models. Embodiments of the present invention can use, for example, the start and end times of the identified nodes as features for generating the prediction model. Embodiments of the present invention deal with the problem of computing a point or stage in a process execution where it makes sense to collect data and generate a prediction. In particular, embodiments of the present invention address developing a set of executions whose data should be included in the computation of prediction models that correspond to different execution stages. Further, embodiments of the present invention address computing the current stage for a running process instance.

Figure 1:
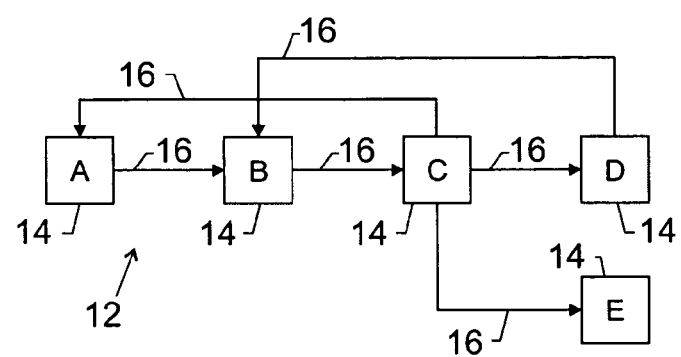
FIG. 1 is a diagram illustrating an exemplary process definition with nodes and arcs in accordance with embodiments of the present invention.

FIG. 1 is a diagram illustrating an exemplary process definition with nodes and arcs in accordance with embodiments of the present invention. This diagram is generally referred to by the reference numeral 10. As discussed above, the diagram 10 shows a process definition 12, which is composed of nodes 14 (steps in the process), and arcs 16 (connectors that define the order of execution among the nodes). Additionally, each node 14 may be assumed to have a unique identifier. In the exemplary diagram 10, the nodes have letters of the alphabet for unique identifiers. Specifically, the nodes each have the distinct identifiers A, B, C, D, and E.

Additionally, FIG. 1 may be utilized to illustrate an exemplary process instance trace. A process instance trace may be defined as a string that concatenates identifiers of nodes executed within a certain completed process instance. In a trace, each node identifier appears in the string once for each time the node is executed. Accordingly, the same node identifier may appear several times in a trace.

While there may be several types of traces, there are two general types. First, there is a start-time based trace, in which the nodes appear in the trace ordered by node activation time. Second, there is an end-time based trace, in which nodes appear in the string ordered by node completion time. In both start-time and end-time based traces, the time order is ascending (nodes that start or complete first also in some embodiments appear first). For example, ABCD and ABCDBCE are two possible traces of the process represented in the diagram 10. Generally, different instances of the same process may have different traces, and the number of different traces that a process can generate may be unbounded.

In one embodiment of the present invention, a separate model may be derived for every possible subtrace or substring of a given trace to make the best possible prediction. For example, in reference to diagram 10, separate models may be derived for subtraces AB, ABC, ABCDB, and so on. If it is desirable to make a prediction on a running process instance, the current subtrace should be examined and its corresponding model used for making a prediction. This approach may guarantee that all possible available information is used for the prediction, and that a model specifically derived for that very same portion of execution (i.e., same executed nodes) is used. However, this approach may not always be practical because the number of possible subtraces may be unbounded making it difficult if not impossible to compute the very large or infinite number of models. Accordingly, embodiments of the present invention address problems with deriving process prediction models that result from the potentially unlimited number of process definition traces.

In one embodiment of the present invention, the notion of a stage may be introduced to address the model derivation problems associated with the potentially unlimited number of process traces. Like a trace, a stage may be a string of node identifiers. However, unlike a trace, a stage may not necessarily reflect each one of the nodes executed up to a given point. Stages may be derived from traces by pruning repetitions of consecutive nodes (i.e., loops) and replacing them by a representative node or set of nodes as determined by a particular strategy. Accordingly, a limit may be placed on the number of stages for which it is practical to infer prediction models.

Figure 2:
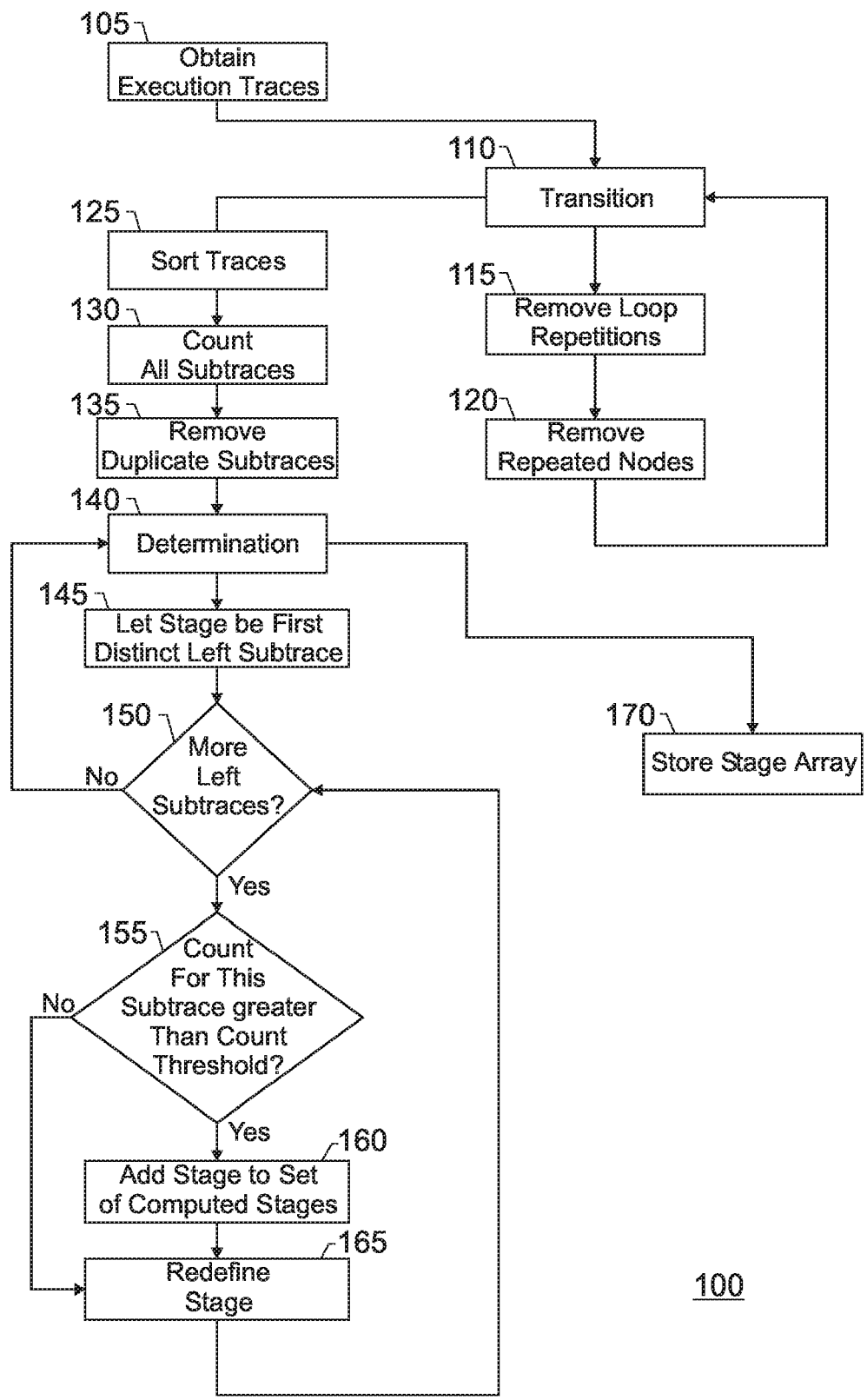
FIG. 2 is a block diagram illustrating an algorithm for stage computation in accordance with embodiments of the present invention.

FIG. 2 is a block diagram illustrating an algorithm for stage computation in accordance with embodiments of the present invention. The algorithm is generally referred to by reference number 100. While FIG. 2 separately delineates specific modules, in other embodiments, individual modules may be split into multiple modules or combined into a single module. For example, in some embodiments of the present invention, the modules in the illustrated algorithm 100 do not operate in the illustrated order. Further, individual modules may be broken into multiple modules or multiple modules may be combined into a single module. Further, individual modules and components may represent hardware, software, steps in a method, or some combination of the three. In one embodiment, the algorithm 100 is based on process execution data and not the associated process definition.

The algorithm illustrated in FIG. 2 relates to detecting stages for computation of prediction models for each detected stage. The algorithm, as illustrated, begins with obtaining execution traces in block 105. For example, in block 105, the execution traces, which may be either start-time or end-time based, may be obtained from a database. The portion of the algorithm represented by block 105 may also include reading a process log and determining all trace strings (end-time or start-time based), in accordance with a selected strategy. A process log may be a data repository (e.g., files or databases) that stores process execution data such as the time in which each node was started and completed in each process execution.

Embodiments of the present invention may apply various different strategies. In one strategy, for each substring in which all elements are the same (e.g., AAAAA), only one occurrence of the node in the substring is kept as the trace (e.g., A). This strategy may have additional substrategies such as keeping only the first occurrence, only the last occurrence, only a randomly picked occurrence, or some other policy. A second exemplary strategy is keeping a maximum designated number of occurrences, n, where n is a user designated loop threshold. This strategy may incorporate different options depending on which n occurrences of a plurality of occurrences are chosen, such as the first n occurrences, the last n occurrences, or some other policy for designating occurrences.

Additionally strategies similar to those presented above for single nodes may be generalized for node substrings instead of individual nodes. For example, a case may involve a sequence of K nodes, wherein a substring is characterized by consecutive repetition of a certain pattern (e.g., ABABA-BAB). A strategy may apply to the repeated substring AB of the larger substring as applied to single nodes in the previously presented strategies. Such a strategy may also incorporate policies similar to those discussed above. Further, other strategies and other policies may be utilized regarding repeated node substrings in embodiments of the present invention.

Next, the algorithm 100 may proceed to a transition block (block 110). Block 110 may direct traces having a certain number of loops (e.g., 1, 2, or more) to a loop removal block (block 115), where loops are removed as described above. Block 115 may represent designating a strategy and removing loop repetitions that exceed a loop threshold based on the designated strategy. For example, once all the traces are determined, each trace may be processed in block 115 to remove all but one random occurrence of a node in accordance with a chosen strategy. This removal may be significant in embodiments of the present invention because, as previously discussed, problems associated with infinite traces and impractically high numbers of traces result from loops.

Block 120 represents removal of repeated nodes in a broken loop situation. In embodiments of the present invention, this removal is similar to block 115. However, it may be different in that it involves removal of repeated but non-consecutive appearances of a node or of a substring. For example, in the trace ABCAD, node A appears twice and hence there is a loop. However, while there is a loop, there is no consecutive appearance of any substring in the trace ABCAD. Block 120 may represent removal of such a loop in accordance with defined strategies, such as those discussed above (e.g., keep only the first occurrence, keep only the last occurrence, and so forth). Additionally, the generalization to substrings rather than single nodes also applies.

If no loops exist in a trace or once loops have been removed for each trace, the transition block 110 may direct the algorithm 100 to proceed with sorting the traces, as illustrated by block 125. Sorting the traces (block 125) may comprise defining an order for the node identifiers such as a lexicographic order. Further, sorting the traces (block 125) may comprise ordering the trace strings for the different process instances and creating an ordered list, which may comprise an array of sorted traces.

Next, the algorithm 100 may proceed to count all subtraces (block 130) and remove duplicate traces (block 135). First, regarding counting all subtraces (block 130), each left subtrace of every trace may be determined. A left subtrace is a left substring or a substring starting from the leftmost node identifier in the trace string. For example, AB is a left subtrace in diagram 10 and BC is not. Accordingly, a left subtrace may contain the node identifiers of a process instance at some point before the execution is completed (i.e., during the execution). In block 130, for each left subtrace of every trace, the number of instances that have that particular left subtrace may be counted. Further, in block 135 duplicate subtraces may be removed from the ordered list.

After sorting traces (block 125), counting subtraces (block 130), and removing duplicate subtraces (block 135), the algorithm may proceed to a determination block 140. The determination block 140 may represent determining whether the array of traces contains traces that should be processed in the remainder of the algorithm 100 or the array is ready for storage. If there are more traces for processing, the algorithm 100 may proceed in block 145 by defining a stage as the first distinct left subtrace. In other words, the first left subtrace that differs (i.e., subtraces are not equal) from any previous subtraces may be considered. Further, it should be noted that subtraces may be considered equal if they have the same nodes and the nodes are in the same order. For example, if the current trace is ABACD and stages A and AB are already in the list of stages, then ABA is the first distinct left subtrace.

Block 150 represents another determination block. In one embodiment of the present invention, block 150 represents a determination of whether there are more left subtraces to process. If there are more, the algorithm 100 may continue to block 155. Otherwise, the algorithm 100 may return to block 140. Block 155 may be a determination block wherein a determination is made as to whether a count (i.e., the number of past instances that produced that trace) for the subtrace being processed is greater than a count threshold. This count threshold may be a user defined limiting factor. If the count for the subtrace is more than a threshold, the subtrace (e.g., ABA in the previous example) may be added to a set of traces as represented by block 160. In other words, the stage may be added to the set of computed stages. This addition in block 160 may assure a sufficient number of instances are present to allow computation of an accurate prediction model.

After block 160, the algorithm may proceed to a conditional redefining of the stage in block 165. Alternatively, if the count for the subtrace is less than the threshold, block 155 may direct the algorithm 100 to bypass block 160 and proceed directly to block 165. Block 165 may represent a redefinition of the stage dependent upon, or conditioned on, whether a particular determination is made. For example, a determination may be made as to whether the left subtrace being considered is smaller than the whole trace (i.e., whether the trace has more elements). Next, if the trace has more elements, the next node to the right of the subtrace (e.g., node C in the previous example) may be added and considered the new left subtrace (e.g., ABAC based on the previous example) and the algorithm 100 may then return to the determination block 150. Alternatively, if the subtrace does not have more elements (i.e., the subtrace is equal to the full trace), the algorithm 100 may directly return to block 150. However, it should be noted that in other embodiments, different implementations may apply. For example, instead of basing the procedures on a left subtrace, a right subtrace may be incorporated.

As FIG. 2 suggests, the procedures represented by blocks 140-165 may be repeated for each trace, from the start to the end of the array of sorted traces. Additionally, the procedures represented by blocks 150-165 may be repeated until all subtraces of the subject trace have been processed. Finally, the algorithm 100 may proceed to block 170, which may represent storing the stage array in persistent storage (i.e., a database).

In one embodiment of the present invention, completion of the algorithm 100 corresponds with a set of stages having been defined. Further, each stage of the set may be characterized by a set of node identifiers that, along with the definition of the strategies for eliminating or reducing repeated appearances, identifies a certain set of node executions whose data can be used to compute prediction models.

Figure 3:
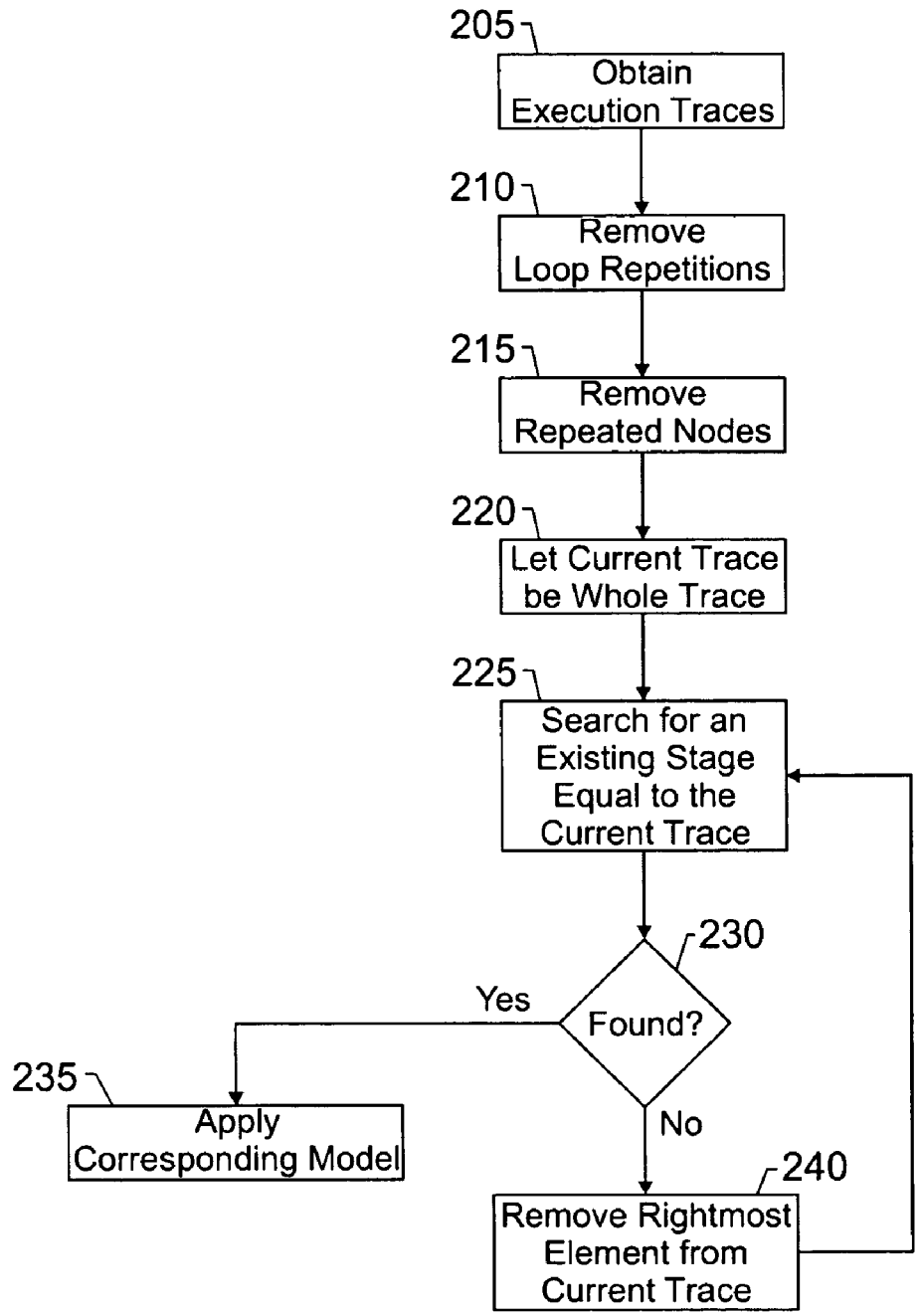
FIG. 3 is a block diagram illustrating an algorithm for stage identification in accordance with embodiments of the present invention.

FIG. 3 is a block diagram illustrating an algorithm for stage identification in accordance with embodiments of the present invention. The algorithm is generally referred to by reference number 200. While the embodiment illustrated in FIG. 3 separately delineates specific modules, in other embodiments, individual modules may be split into multiple modules or combined into a single module. For example, in some embodiments of the present invention, the modules in the illustrated algorithm 200 do not operate in the illustrated order. Further, individual modules may be broken into multiple modules or multiple modules may be combined into a single module. Further, individual modules and components may represent hardware, software, steps in a method, or some combination of the three.

Specifically, FIG. 3 represents an algorithm for determining the current stage for a running process. The algorithm 200 may facilitate retrieval and application of the prediction model corresponding to the current stage and thus, a prediction for the running process instance. In the illustrated embodiment, the algorithm 200 begins with obtaining an execution trace that may be start-time or end-time based (block 205). For example, the set of nodes being executed in the process instance being considered may be obtained from a database. It should be noted that in one embodiment of the present invention the same strategy (start-time or end-time based) used in the stage computation phase (i.e., algorithm 100) is used in the phase represented by algorithm 200.

As discussed above, loops may be the source of problems with infinite and impractically high numbers of traces. Accordingly, much like the loop removal in algorithm 100, block 210 in the illustrated embodiment may represent removing loop repetitions that exceed a loop threshold based on loop handling strategy. Similarly, block 215 may represent removing repeated nodes in broken loop situations based on the strategy. The activity in block 215 may also be analogous to similar activity in the computation phase (algorithm 100). However, it may differ from the previous phase (algorithm 100) in that it only applies to the single process instance being considered. In one embodiment, the strategy forming the basis for removal in blocks 210 and 215 is the same as the strategy designated in block 115 of the stage computation phase (algorithm 100).

Block 220 represents defining the trace in its current state as the whole trace. In some embodiments, this may enable discernment of a stage that matches the whole trace. Further, the whole trace may have been cleaned from repetitions as described previously. Accordingly, full use of the information present in the trace may be achieved using a data mining model developed with the whole trace. Further, the computed model may be more accurate because it may be based on a large number of features.

Block 225 represents searching for an existing stage equal to the current trace. Specifically, in one embodiment, block 225 comprises searching for stages computed in the earlier phase (algorithm 100) that match the current trace. Additionally, block 225 may represent determining whether the current trace is a stage or not. For example, the current trace may not be promoted to the role of a stage because the current trace is not present in enough instances to compute a prediction model. Further, block 230 may represent determining whether a match was found in block 225 or not.

The algorithm may then proceed to either blocks 235 or 240 depending on whether the current trace matches an existing stage (block 230). If the current trace matches a stage as determined in block 225, the model corresponding to the match may be applied in block 235. This application (block 235) may be effective because the model will be based on information that is available from the current trace. Alternatively, if the current trace does not match a stage (block 225), the algorithm may remove the rightmost element from the trace thus creating a new trace (block 240) and, beginning with block 225, the algorithm 200 may be repeated using the newly created trace (i.e., attempt to match the newly generated trace with a stage). This repetition or process loop may end (block 240) upon finding a matching stage. In one embodiment, the repetition or process loop ends when the matching stage is an empty stage (i.e., a stage that corresponds to the beginning of the process, where only information available at the start of the process is used to generate the predictive model).

Each of the phases (algorithm 100 and algorithm 200) presented above may operate together or independently. In one embodiment, the algorithms 100, 200 cooperate to identify a set of stages and a set of candidate features to be considered when generating a plurality of predictive models. Additionally, the algorithms 100, 200 may cooperate to facilitate a determination of which of the plurality of predictive models will be most effectively used on a running process.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method for analyzing a process, comprising:
    obtaining a process execution trace including at least one subtrace, the process execution trace comprising at least one loop repetition;
    removing loop repetitions within the process execution trace;
    identifying the subtrace as a point for data collection in a process;
    collecting data related to the subtrace;
    combining the process execution trace with other process execution traces.

2. The method of claim 1, comprising removing at least one node from a broken loop within the process execution trace, the broken loop comprising a plurality of nodes.

3. The method of claim 1, comprising identifying a plurality of subtraces.

4. The method of claim 3, comprising counting the plurality of subtraces.

5. The method of claim 3, comprising collecting data for each of the plurality of subtraces.

6. The method of claim 1, comprising removing duplicate process execution traces.

7. The method of claim 6, comprising removing a single node.

8. The method of claim 1, comprising defining a left subtrace.

9. The method of claim 1, comprising determining a model corresponding to the identified subtrace.

10. The method of claim 9, comprising using the model to predict a process outcome.

11. The method of claim 9, comprising applying the model corresponding to the point for data collection.

12. The method of claim 1, comprising defining a strategy and determining trace strings in accordance with the defined strategy.

13. A system for computing stages, comprising:
    an acquiring module adapted to obtain a process execution trace;
    a loop removal module adapted to remove loop repetitions within the process execution trace;
    a subtrace defining module adapted to identify a subtrace from the process execution trace;
    a stage defining module adapted to identify the subtrace as a point for data collection in a process; and
    a linking module adapted to combine the process execution trace with other process execution traces.

14. The system of claim 13, comprising a node removal module adapted to remove nodes from a broken loop within the process execution trace.

15. The system of claim 13, comprising a duplicate trace removal module adapted to remove duplicate traces.

16. The system of claim 13, comprising a model determination module adapted to determine a model corresponding to the point for data collection.

17. The system of claim 16, comprising a results module adapted to use the model to predict a process outcome.

18. The system of claim 17, wherein the results module is adapted to apply the model corresponding to the point.

19. A computer program for analyzing a process, comprising:
    a tangible medium;
    an acquiring module stored on the tangible medium, the acquiring module adapted to obtain a process execution trace;
    a loop removal module stored on the tangible medium, the loop removal module adapted to remove loop repetitions within the process execution trace;
    a subtrace defining module stored on the tangible medium, the subtrace defining module adapted to identify a subtrace from the process execution trace;
    a stage defining module stored on the tangible medium, the stage defining module adapted to identify the subtrace as a point for data collection in a process; and
    linking module stored on the tangible medium, the linking module adapted to combine the process execution trace with other process execution traces.

20. The computer program of claim 19, comprising a node removal module stored on the tangible medium, the node removal module adapted to remove nodes from a broken loop within the process execution trace.

21. The computer program of claim 19, comprising a duplicate trace removal module stored on the tangible medium, the duplicate trace removal module adapted to remove duplicate traces.

22. The computer program of claim 19, comprising a model determination module stored on the tangible medium, the model determination module adapted to determine a model corresponding to the point for data collection.

23. The computer program of claim 22, comprising a results module stored on the tangible medium, the results module adapted to use the model to predict a process outcome.

24. The computer program of claim 23, wherein the results module is adapted to apply the model corresponding to the point.

25. A system for analyzing a process, comprising:
means for obtaining a process execution trace;
means for removing loop repetitions within the process execution trace;
means for identifying a subtrace from the process execution trace;
means for identifying the subtrace as a point for data collection in a process; and
means for compiling the process execution trace with another process.

* * * * *

UNITED STATES PATENT AND TRADEMARK OFFICE
CERTIFICATE OF CORRECTION

| | | |
|---|---|---|
| PATENT NO. | : 7,971,191 B2 | Page 1 of 1 |
| APPLICATION NO. | : 10/865464 | |
| DATED | : June 28, 2011 | |
| INVENTOR(S) | : Maria Guadalupe Castellanos et al. | |

It is certified that error appears in the above-identified patent and that said Letters Patent is hereby corrected as shown below:

In column 7, line 48, in Claim 1, after "subtrace;" insert -- and --.

Signed and Sealed this
Twentieth Day of March, 2012

David J. Kappos
*Director of the United States Patent and Trademark Office*